(12) United States Patent
Kanno

(10) Patent No.: US 7,900,117 B2
(45) Date of Patent: Mar. 1, 2011

(54) SEMICONDUCTOR MEMORY DEVICE AND ITS CONTROL METHOD

(75) Inventor: Shinichi Kanno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 12/400,863

(22) Filed: Mar. 10, 2009

(65) Prior Publication Data

US 2009/0177944 A1 Jul. 9, 2009

Related U.S. Application Data

(63) Continuation of application No. PCT/JP2008/063345, filed on Jul. 17, 2008.

(30) Foreign Application Priority Data

Sep. 26, 2007 (JP) .................. 2007-249509

(51) Int. Cl.
*H03M 13/00* (2006.01)
(52) U.S. Cl. .......... 714/755; 714/786; 714/758; 714/757
(58) Field of Classification Search .................. 714/755, 714/786, 758, 757
See application file for complete search history.

(56) References Cited

U.S. PATENT DOCUMENTS

| 5,712,861 | A | 1/1998 | Inoue et al. | |
|---|---|---|---|---|
| 5,996,105 | A * | 11/1999 | Zook | 714/755 |
| 7,406,654 | B2 * | 7/2008 | Moriwaki | 714/801 |
| 2007/0130496 | A1 | 6/2007 | Kanno | |
| 2007/0174740 | A1 | 7/2007 | Kanno | |

FOREIGN PATENT DOCUMENTS

| EP | 0 229 698 A2 | 7/1987 |
|---|---|---|
| EP | 0 571 096 A2 | 11/1993 |
| JP | 63-275225 | 11/1988 |
| JP | 2000-181807 A | 6/2000 |
| JP | 2000-269824 A | 9/2000 |
| JP | 2002-367296 A | 12/2002 |
| JP | 2003-196165 A | 7/2003 |
| JP | 2004-501466 A | 1/2004 |
| JP | 2005-216437 A | 8/2005 |
| JP | 2009-59422 A | 3/2009 |

OTHER PUBLICATIONS

U.S. Appl. No. 12/393,654, filed Feb. 26, 2009, Fukutomi, et al.
U.S. Appl. No. 12/396,006, filed Mar. 2, 2009, Sato, et al.
U.S. Appl. No. 12/395,811, filed Mar. 2, 2009, Fukutomi, et al.
U.S. Appl. No. 12/398,608, filed Mar. 5, 2009, Fukutomi, et al.
U.S. Appl. No. 12/404,861, filed Mar. 16, 2009, Kanno, et al.
U.S. Appl. No. 12/394,665, filed Feb. 27, 2009, Yano, et al.
U.S. Appl. No. 12/555,274, filed Sep. 8, 2009, Kanno, et al.

* cited by examiner

*Primary Examiner* — Guy J Lamarre
(74) *Attorney, Agent, or Firm* — Oblon, Spivak, McClelland, Maier & Neustadt, L.L.P.

(57) ABSTRACT

A semiconductor memory device includes a temporary storage circuit configured to receive data items and store the data items in rows and columns, a detecting code generator configured to generate first detecting codes used to detect errors in the data items, respectively, a first correcting code generator configured to generate first correcting codes used to correct errors in first data blocks corresponding to the columns, respectively, each of the first data blocks containing data items that are arranged in a corresponding one of the columns, and a second correcting code generator configured to generate second correcting codes used to correct errors in second data blocks corresponding to the rows, respectively, each of the second data blocks containing data items that are arranged in a corresponding one of the rows.

10 Claims, 12 Drawing Sheets

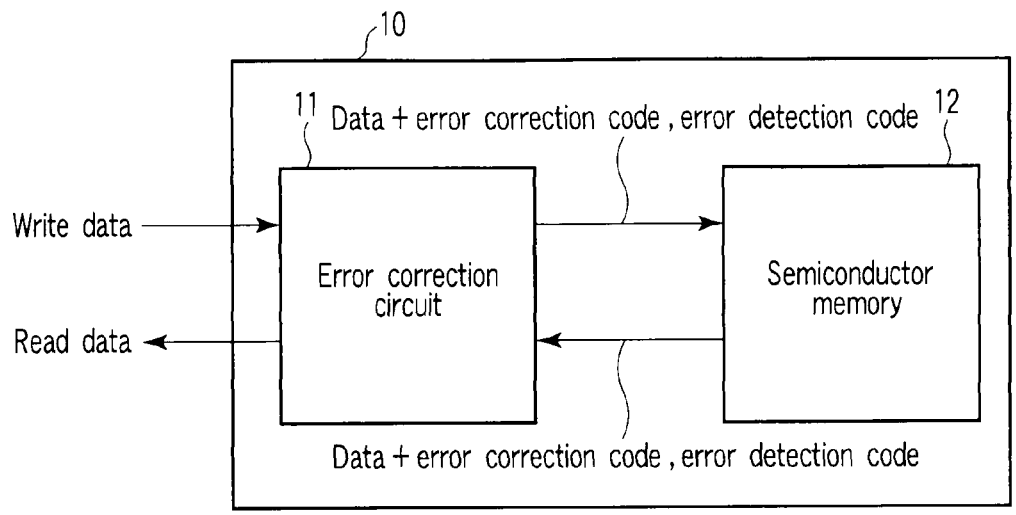
F I G. 1
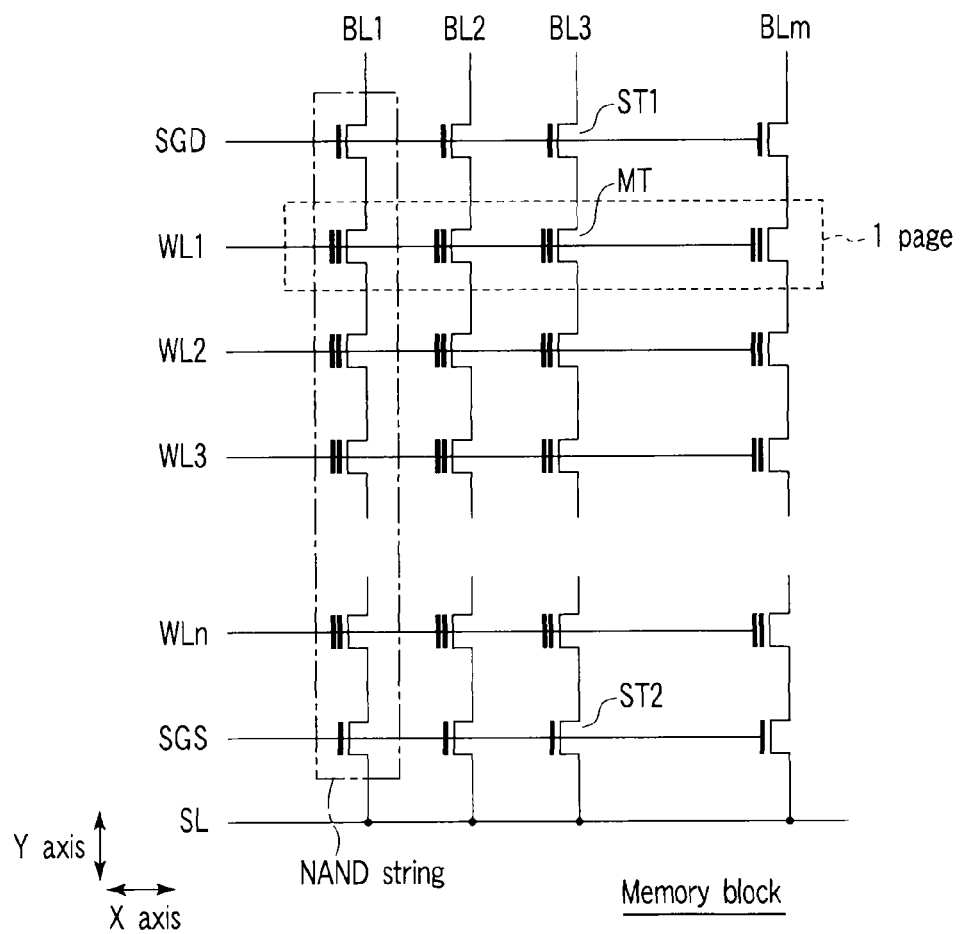
F I G. 2

FIG. 5

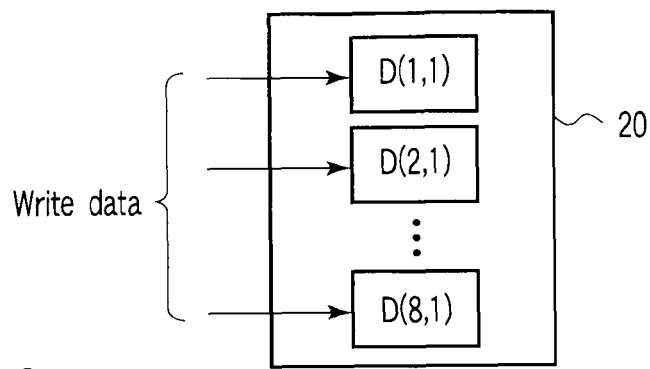
F I G. 6
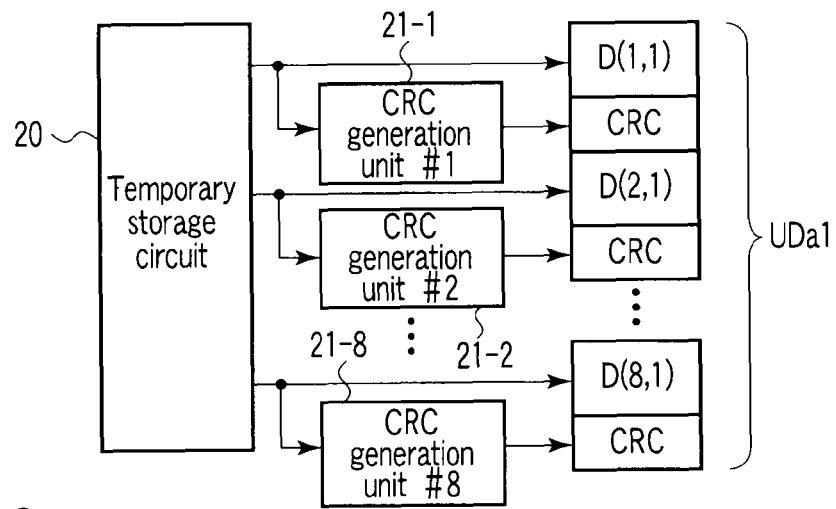
F I G. 7
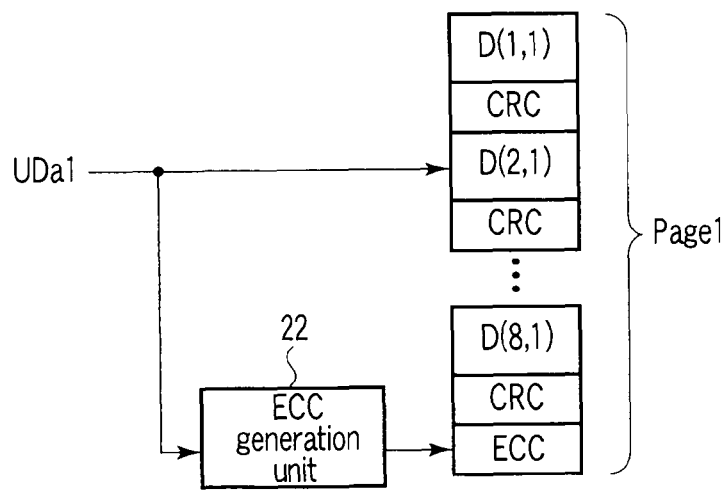
F I G. 8

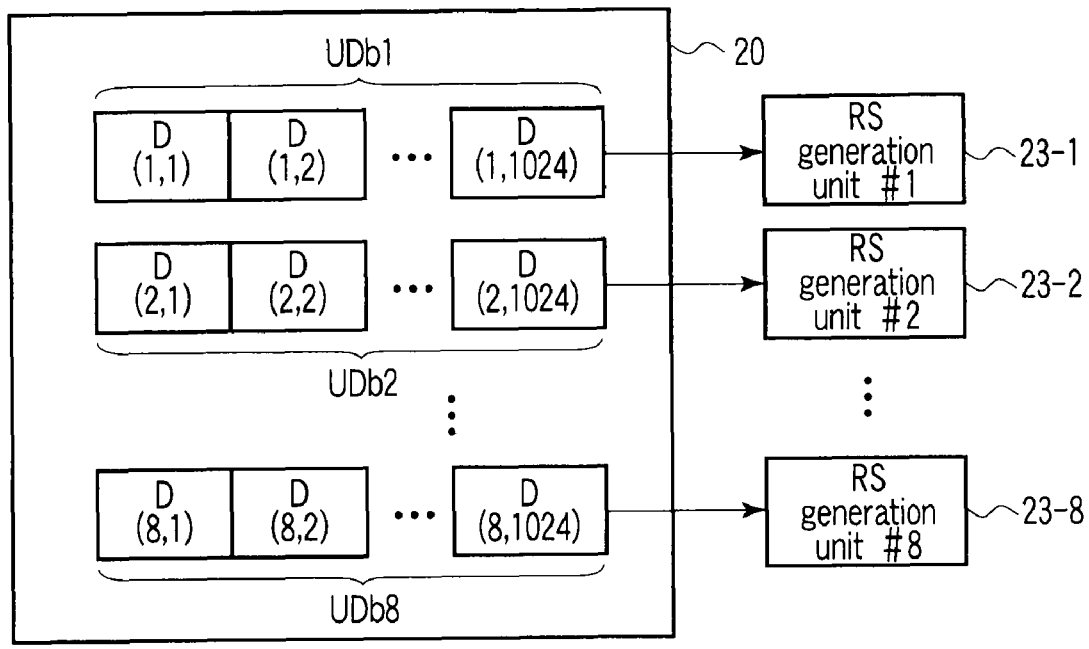
F I G. 9
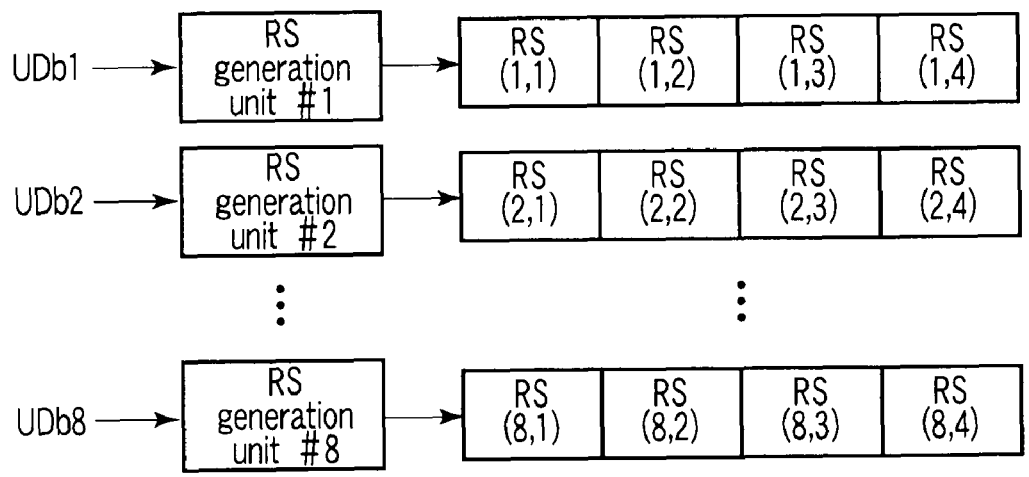
F I G. 10

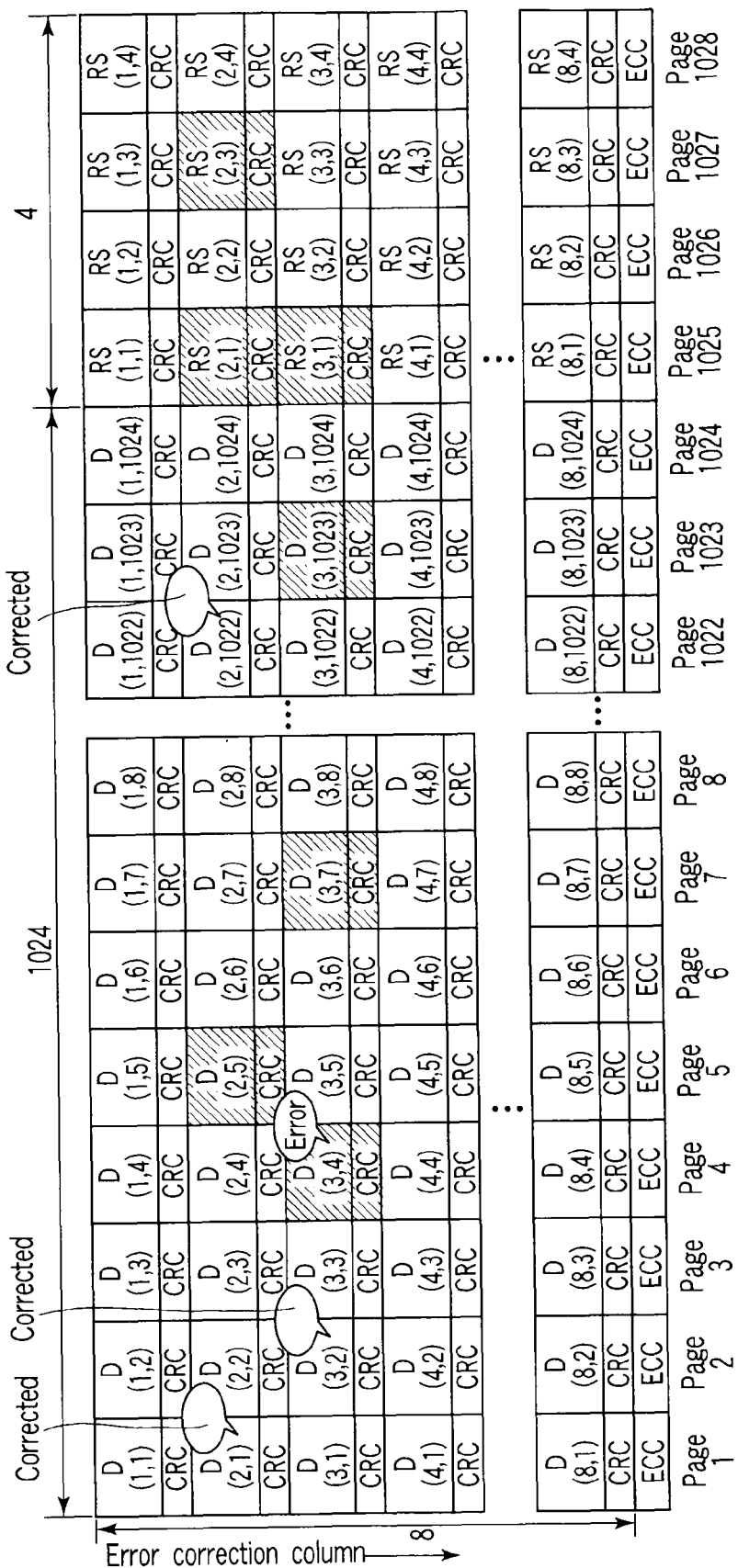
F I G. 14

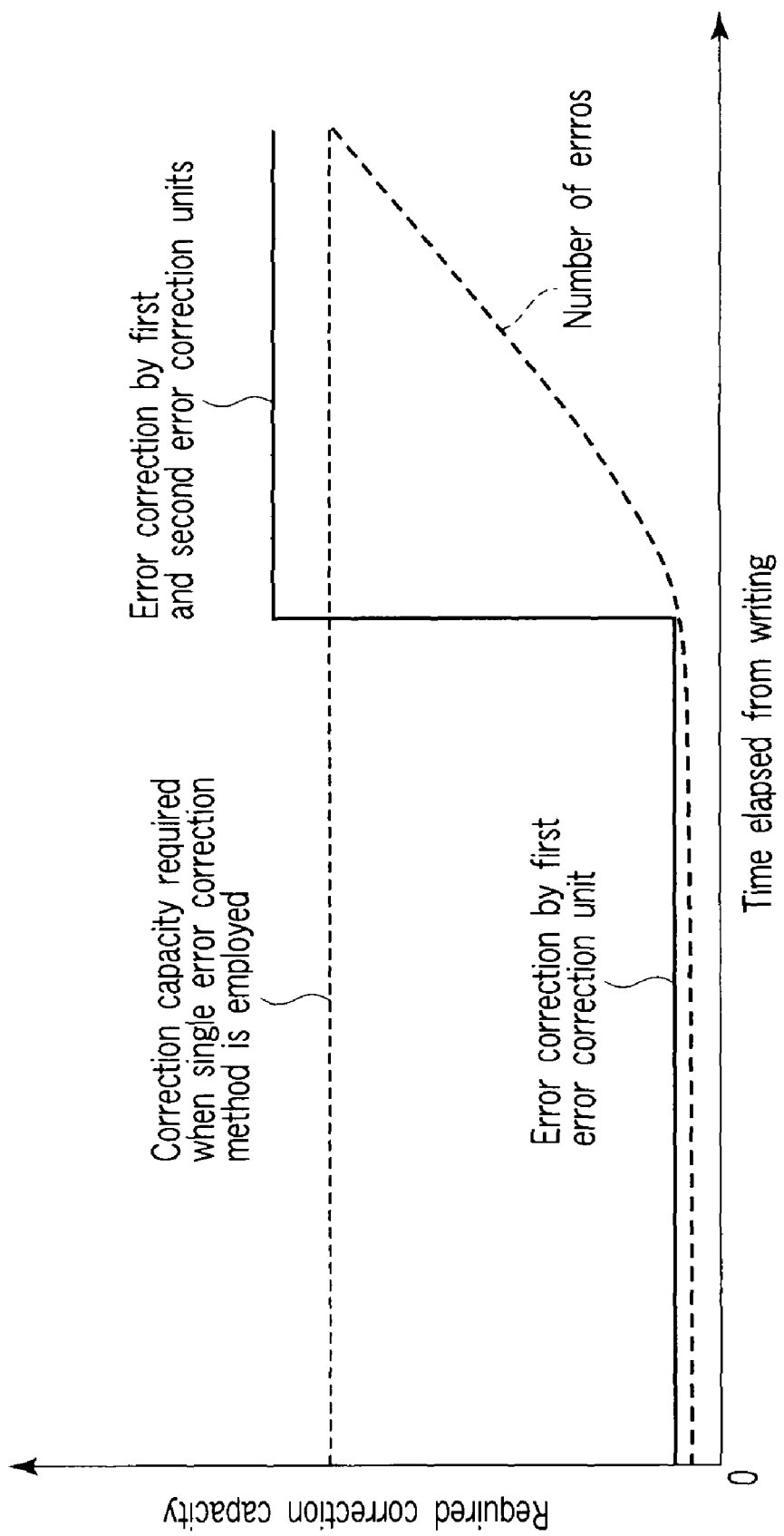
F I G. 16

SEMICONDUCTOR MEMORY DEVICE AND ITS CONTROL METHOD

CROSS-REFERENCE TO RELATED APPLICATIONS

This is a Continuation Application of PCT Application No. PCT/JP2008/063345, filed Jul. 17, 2008, which was published under PCT Article 21(2) in Japanese.

This application is based upon and claims the benefit of priority from prior Japanese Patent Application No. 2007-249509, filed Sep. 26, 2007, the entire contents of which are incorporated herein by reference.

BACKGROUND OF THE INVENTION

1. Field of the Invention

The present invention relates to a semiconductor memory device and its control method, and for example, to a semiconductor memory device provided with a correction circuit for correcting errors in information nonvolatilely stored in a semiconductor memory, and a method of controlling the device.

2. Description of the Related Art

Depending upon the type of nonvolatile memory device, the state of the physical amount of a memory corresponding to the amount of data stored therein varies with lapse of time. When a preset time elapses, data may be lost. Various memory devices have this property. For instance, a nonvolatile semiconductor memory device using, as memory cells, transistors having a so-called laminated gate structure is included in such memory devices.

The laminated gate structure comprises a tunnel insulation film, floating gate electrode, inter-gate insulation film and control gate electrode. To store information in a memory cell, electrons are injected from the substrate side into the floating gate electrode via the tunnel insulation film. The electric charge accumulated in the floating gate electrode serves as information. Since the electric charge accumulated in the floating gate electrode leaks into the substrate through the tunnel insulation film with lapse of time, with the result that the information stored in the memory cell will be lost with lapse of time (an error will occur in information).

If the time elapsing from the storage of information is short, the possibility of occurrence of errors in information is small. In contrast, if the time elapsing from the storage of information is long, the possibility of occurrence of errors in information is strong. Memory devices including such memory cells as the above may be provided with an error correction mechanism for correcting errors in information.

In general, a correction mechanism having a high error correction performance is necessary to correct errors that occur in information consisting of a plurality of bits because, for example, much time has elapsed. Correction mechanisms having a high error correction performance generally have a large circuitry scale, consume much power, and require much time for processing. However, to guarantee correct restoration of data even when much time elapses from the storage of the data, a correction mechanism having a high error correction performance is provided, and is always used regardless of the time elapsing from the storage of the data.

Thus, a correction mechanism of high error correction performance is used even to read information, from the storage of which only a short time elapses, namely, even to read information that does not contain so many errors. This is wasting of power.

Furthermore, in general, to enhance error correction performance, it is necessary to enlarge the information to be subjected to error correction. For instance, to enhance error correction performance, an error correcting code is generated in units of, for example, 4 k-byte data pieces, instead of 512-byte data pieces (each 4 k-byte data piece is formed by coupling a plurality of 512-byte data pieces). In this case, 4 k-byte data must be read even when 512-byte data is wanted to be read. This also increases the power consumption of the memory device.

The following document is regarded as a prior art reference related to the present invention:
JP-A 63-275225 (KOKAI)

In the reference, a correction apparatus which has a high error correction capability is disclosed.

BRIEF SUMMARY OF THE INVENTION

According to an aspect of the present invention, there is provided a semiconductor memory device comprising: a temporary storage circuit configured to receive a plurality of data items and store the data items in rows and columns; a detecting code generator configured to generate a plurality of first detecting codes used to detect errors in the plurality of data items, respectively; a first correcting code generator configured to generate a plurality of first correcting codes used to correct errors in a plurality of first data blocks corresponding to the columns, respectively, each of the first data blocks containing a number of data items that are arranged in a corresponding one of the columns; a second correcting code generator configured to generate a plurality of second correcting codes used to correct errors in a plurality of second data blocks corresponding to the rows, respectively, each of the second data blocks containing a number of data items that are arranged in a corresponding one of the rows; and a semiconductor memory configured to nonvolatilely store the data items, the first detecting codes, the first correcting codes and the second correcting codes.

According to an aspect of the present invention, there is provided a method of controlling a semiconductor memory device, the method comprising: receiving a plurality of data items and storing the data items in rows and columns in a temporary storage circuit; generating a plurality of first detecting codes used to detect errors in the plurality of data items, respectively; generating a plurality of first correcting codes used to correct errors in a plurality of first data blocks corresponding to the columns, respectively, each of the first data blocks containing a number of data items that are arranged in a corresponding one of the columns; generating a plurality of second correcting codes used to correct errors in a plurality of second data blocks corresponding to the rows, respectively, each of the second data blocks containing a number of data items that are arranged in a corresponding one of the rows; and nonvolatilely storing, in a semiconductor memory, the data items, the first detecting codes, the first correcting codes and the second correcting codes.

BRIEF DESCRIPTION OF THE SEVERAL VIEWS OF THE DRAWING

FIG. 1 is a schematic block diagram illustrating a semiconductor memory device 10 according to an embodiment;

FIG. 2 is an equivalent circuit diagram illustrating the structure of a memory block BLK contained in a NAND flash memory;

FIG. 5 is a view illustrating the data structure employed in a temporary storage circuit 20 for writing;

FIG. 6 is a view illustrating part of the error detecting code generation operation and error correcting code generation operation of the error correction circuit 11;

FIG. 7 is a view illustrating part of the error detecting code generation operation and error correcting code generation operation, which is subsequent to the part shown in FIG. 6;

FIG. 8 is a view illustrating part of the error detecting code generation operation and error correcting code generation operation, which is subsequent to the part shown in FIG. 7;

FIG. 9 is a view illustrating part of the error detecting code generation operation and error correcting code generation operation, which is subsequent to the part shown in FIG. 8;

FIG. 10 is a view illustrating part of the error detecting code generation operation and error correcting code generation operation, which is subsequent to the part shown in FIG. 9;

FIG. 14 is a view illustrating block data obtained by second error correction by the ECC correction unit 31;

FIG. 16 is a graph illustrating the relationship between the time elapsing from writing and required correction performance.

DETAILED DESCRIPTION OF THE INVENTION

Figure 3:
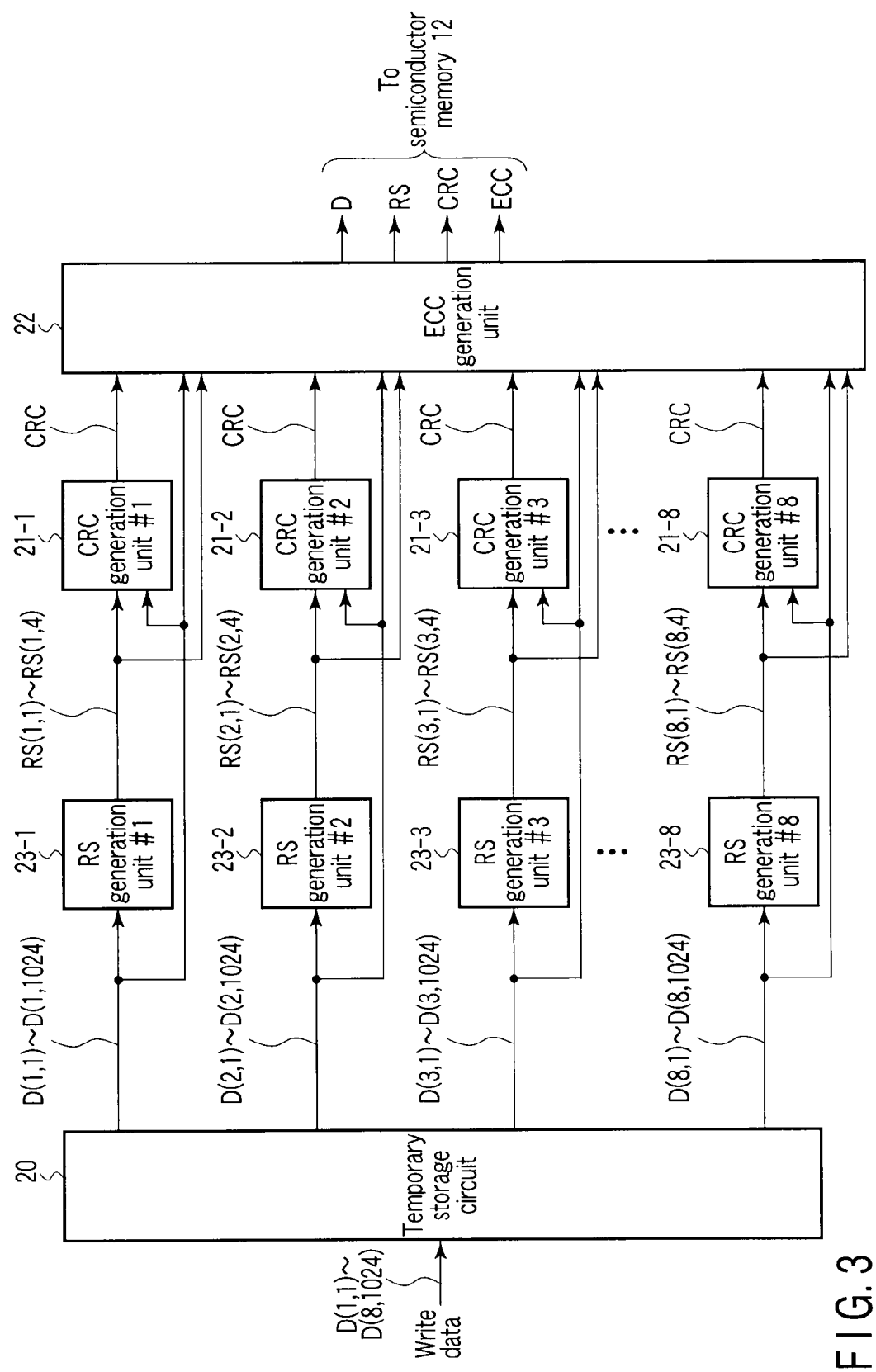
FIG. 3 is a block diagram illustrating the essential part of an error correction circuit 11 related to data writing.

An embodiment of the invention will be described with reference to the accompanying drawings. In the following description, like reference numbers denote like elements, and duplication of explanation will be given only when necessary.

The embodiment described below is merely an example of an apparatus or method for embodying the technical idea of the invention, and hence the materials, shapes, structures and/or arrangement of structural elements are not limited to those described below. They can be modified in various ways without departing from the scope of the invention.

Further, in the embodiment of the invention, each functional block can be realized by hardware, software, or combination thereof. To clarify this, each block will be described mainly in view of its function. Whether each function is realized by hardware or software depends upon the design constraints on the specific embodiment or entire system. Anyone skilled in the art can realize those functions as specific embodiments, using various methods, and such realization is included in the scope of the present invention.

FIG. 1 is a schematic block diagram illustrating a semiconductor memory device 10 according to an embodiment of the invention. The semiconductor memory device 10 comprises an error correction circuit 11 and semiconductor memory 12. The error correction circuit 11 and semiconductor memory 12 are considered to be included in a single semiconductor integrated circuit and are provided on a single semiconductor chip. The semiconductor memory 12 may be any storage if it nonvolatilely stores information and the stored information varies with lapse of time. The semiconductor memory 12 is, for example, a NAND flash memory. In the embodiment, a NAND flash memory will be described as an example of the semiconductor memory 12.

The NAND flash memory is formed of a plurality of memory blocks BLK, in units of which data is erased. Referring now to FIG. 2, the structure of the memory block BLK will be described. FIG. 2 is an equivalent circuit diagram illustrating the structure of one memory block BLK.

The memory block BLK includes m (m: integer not less than 1) NAND strings arranged along the X-axis. Each NAND string includes selective transistors ST1 and ST2, and n (n: integer not less than 1) memory cell transistors MT. The respective selective transistors ST1 included in the m NAND strings have their drains connected to bit lines BL1 to BLm, and their gates connected to a selective gate line SGD in common. Further, the selective transistors ST2 have their sources connected to a source line SL in common, and their gates connected to a selective gate line SGS in common.

Each memory cell transistor MT is a metal oxide semiconductor field effect transistor (MOSFET) that has a laminated gate structure and is formed on a semiconductor substrate with a gate insulation film interposed therebetween. The laminated gate structure includes a charge-accumulating layer (floating gate) formed on the gate insulation film, and a control gate electrode formed on the charge-accumulating layer with the inter-gate insulation film interposed therebetween. In each NAND string, n memory cell transistors MT have their current paths connected in series between source of the selective transistor ST1 and the drain of the selective transistor ST2. Namely, the n memory cell transistors MT are connected in series along the Y axis so that each diffusion region (source/drain region) is shared between the corresponding pair of adjacent transistors MT.

The respective control gate electrodes of the memory cell transistors MT are connected to word lines WL1 to WLn, in order beginning with the memory cell transistor MT closest to the drain side. Accordingly, the drain of the memory cell transistor MT connected to the word line WL1 is connected to the source of the selective transistor ST2. Similarly, the source of the memory cell transistor MT connected to the word line WLn is connected to the drain of the selective transistor ST2.

The word lines WL1 to WLn each connect in common the control gate electrodes of the corresponding memory cell transistors MT to each other between the NAND strings of the memory block BLK. Namely, the control gate electrodes of the memory cell transistors MT arranged in each row of the memory block BLK are connected to each other by the corresponding word line WL. The memory cells connected by the same word line WL are treated as one page, and data writing and reading are performed in units of pages.

Further, bit lines BL1 to BLn each connect in common the drains of the corresponding selective transistors ST1 between a plurality of memory blocks BLK. Namely, the NAND strings arranged in the same column between the memory blocks BLK are connected to the same bit line BL.

In each memory cell transistor MT, the threshold voltage varies in accordance with the number of electrons accumulated in the floating gate electrode, and information corresponding to the difference between the thus-set threshold values is stored. Each memory cell transistor MT may be designed to store information of one bit or a plurality of bits. A sense amplifier (not shown), and a control circuit (not shown) including, for example, a potential generation circuit, which are included in the semiconductor memory 12, have structures enabling the data supplied to the semiconductor memory 12 to be written to and read from the memory cell transistors MT.

The semiconductor memory device 10 is supplied, from an external device, with data (write data) requested to be written to the semiconductor memory 12. The error correction circuit 11 adds error correcting codes and error detecting codes to the write data, and supplies the resultant data to the semiconductor memory 12. The semiconductor memory 12 nonvolatilely stores the write data with the error correcting codes and error detecting codes.

Further, the semiconductor memory 12 supplies the error correction circuit 11 with data (read data) requested to be read, and the error correcting codes and error detecting codes added thereto, in response to a control signal supplied from an external device to the semiconductor memory device 10. The error correction circuit 11 detects errors in read data. If errors exist, the error correction circuit 11 corrects the errors and removes therefrom the error correcting codes and error detecting codes, thereby outputting the corrected read data to the outside. A specific configuration example of the error correction circuit 11 will be described.

[Configuration of Writing Circuit]

Figure 4:
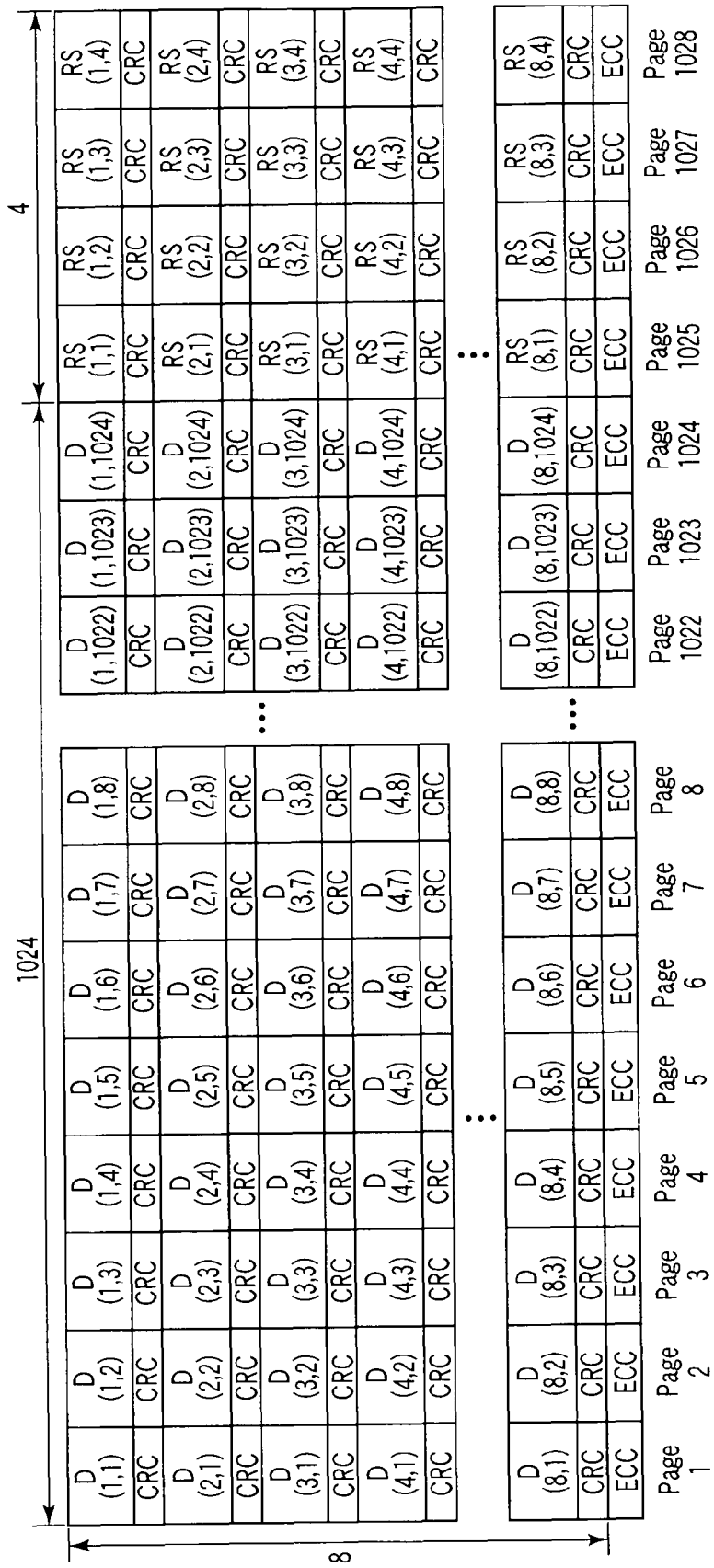
FIG. 4 is a view illustrating the format of data transferred from the error correction circuit 11 to a semiconductor memory 12.

FIG. 3 is a block diagram illustrating the essential part of the error correction circuit 11 related to data writing. FIG. 4 is a view illustrating the format of data transferred from the error correction circuit 11 to the semiconductor memory 12.

The error correction circuit 11 generates an error detecting code in units of data items D of a preset size. The preset size is, for example, 512 bytes. The error correction circuit 11 also generates a first error correcting code in units of a plurality of write data items (including error detecting codes) arranged in each column, and a second error correcting code in units of a plurality of write data items arranged in each row. The number of write data items as a unit for generating an error correcting code is determined based on desired error correction performance and employed error correcting code.

As the error detecting code, a cyclic redundancy checksum (CRC) 32, CRC 16, etc., can be used. Accordingly, in the embodiment, an error detecting code generation unit 21 is a CRC generation unit 21. Since the specific structure of the CRC generation unit 21 is known to anyone skilled in the art, no description will be given thereof. The CRC generation unit 21 generates a CRC in units of 512 bytes of write data items D. In the embodiment, the size of the CRC is 4 bytes.

As the first error correcting code, an error correcting code (ECC) capable of correcting one bit or a plurality of bits is used. More specifically, a bose-chaudhuri hocquenghem (BCH) code or low density parity check (LDPC) code can be used. In the embodiment, a first error correcting code generation unit 22 is recited as the ECC generation unit 22. Since the specific structure of the ECC generation unit 22 is known to anyone skilled in the art, no description will be given thereof. The ECC generation unit 22 generates an ECC code in units of first data blocks UDa, each data block including, for example, 8 write data items D and corresponding 8 CRC codes. In this case, the ECC size is 24 bytes.

As the second error correcting code, an error correcting code capable of correcting, for example, a plurality of bits, i.e., capable of error correction of a higher performance than the first error correcting code, is used. More specifically, a reed-solomon code (RS), for example, is used as the second error correcting code. Accordingly, in the embodiment, a second error correcting code generation unit 23 is an RS generation unit 23. Since the specific structure of the RS generation unit 23 is known to anyone skilled in the art, no description will be given thereof. The RS generation unit 23 generates, for example, four RS codes in units of second data blocks UDb. Accordingly, the RS generation unit 23 can correct errors contained in four write data items included in 1024 write data items D that form a single second data block UDb.

Figure 5:
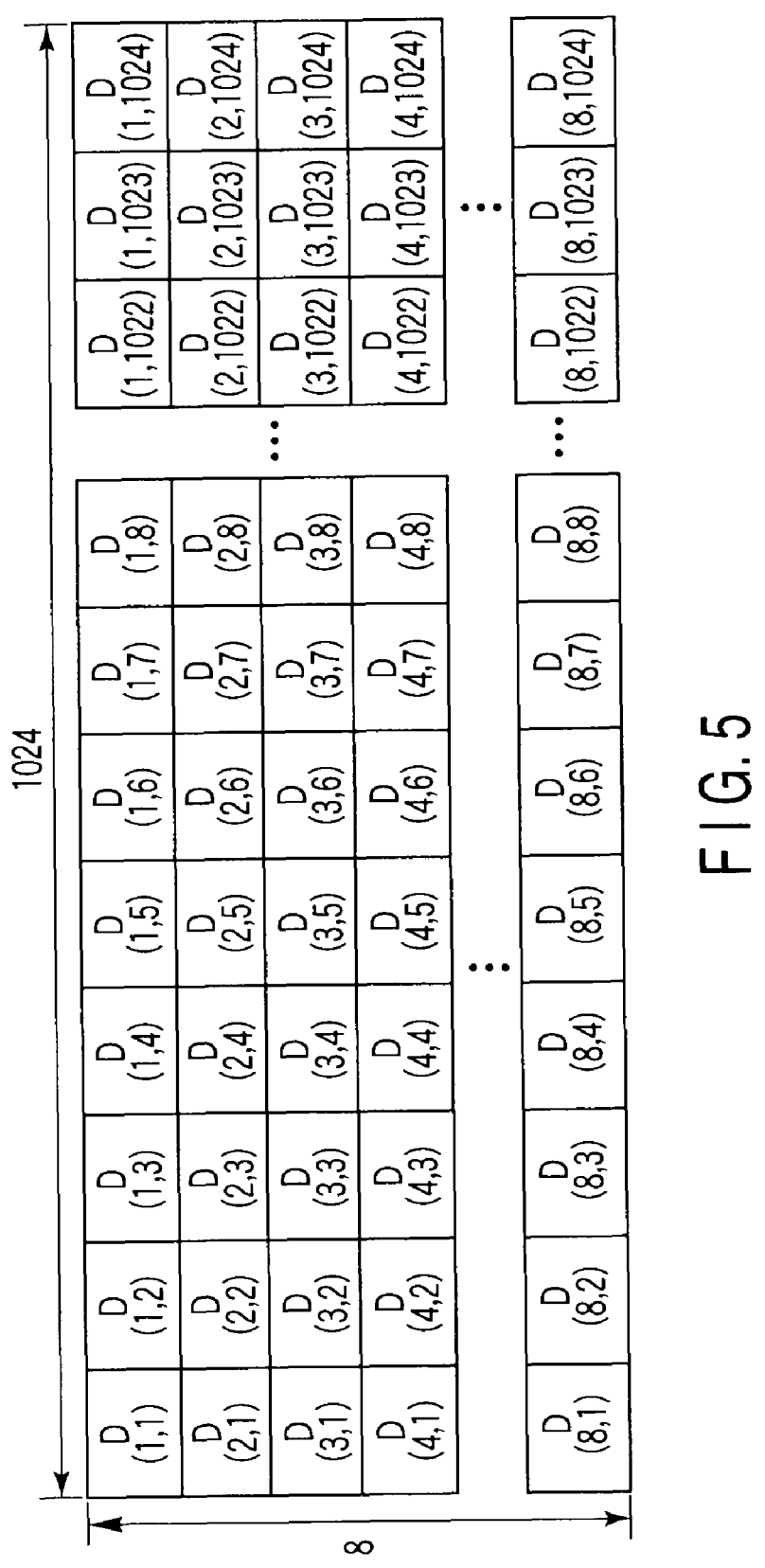

The error correction circuit 11 has a temporary storage circuit 20. The temporary storage circuit 20 is, for example, a volatile memory circuit such as a dynamic random access memory (DRAM). The error correction circuit 11 externally receives a plurality of write data items $D(1, 1)$ to $D(8, 1024)$. The temporary storage circuit 20 temporarily stores the write data items $D(1, 1)$ to $D(8, 1024)$ in columns and rows. FIG. 5 shows the data structure of the temporary storage circuit 20.

As shown in FIG. 5, the temporary storage circuit 20 stores 8 write data items $D(1, p)$ to $(8, p)$ as column data items, which are considered as a unit of processing by the ECC generation unit 22, and stores 1024 write data items $D(q, 1)$ to $(q, 1024)$ as row data items, which are considered as a unit of processing by the RS generation unit 23. p is an arbitrary number included in 1 to 1024, and q is an arbitrary number included in 1 to 8.

The CRC generation unit 21 includes 8 CRC generation units 21-1 to 21-8 corresponding to the 8 write data items $D(1, p)$ to $(8, p)$ as column data items. The 8 CRC generation units 21-1 to 21-8 generate 8 CRC codes corresponding to the 8 write data items $D(1, p)$ to $(8, p)$. The 8 CRC codes are used to detect errors in the 8 write data items $D(1, p)$ to $(8, p)$. The 8 CRC codes are sent to the ECC generation unit 22.

The ECC generation unit 22 generates one ECC code in units of first data blocks UDap, each first data block including 8 write data items $D(1, p)$ to $(8, p)$ and 8 CRC codes corresponding thereto. ECC codes are used to correct errors in first data blocks UDap. In the embodiment, the size of data, which is formed of each first data block UDap and the corresponding ECC code, corresponds to a size of one page (see FIG. 4).

Further, in the embodiment, the RS generation unit 23 generates one RS code in units of second data blocks UDb, each second data block including 1024 write data items $D(1, 1)$ to $D(1, 1024)$ as row data items. The RS generation unit 23 includes 8 RS generation units 23-1 to 23-8 corresponding to the write data rows of the temporary storage circuit 20. The RS generation unit 23-1 generates four RS codes $RS(1, 1)$ to $RS(1, 4)$ for a second data block UDb1. Similarly, the same can be said of the RS generation units 23-2 to 23-8 corresponding to the $2^{nd}$ to $8^{th}$ rows.

The CRC generation units 21-1 to 21-8 generate CRC codes even for 8 RS codes $(1, r)$ to $(8, r)$. r is an arbitrary number included in 1 to 4. Similarly, the ECC generation unit 22 generate one ECC code for a third data block UDc including 8 RS codes $(1, r)$ to $(8, r)$ and 8 CRC codes corresponding thereto. The third data block UDc has the same data size as the first data block UDa.

The write data D, and CRC, ECC and RS codes are sent from the error correction circuit 11 to the semiconductor memory 12 in units of pages shown in FIG. 4. The semiconductor memory 12 stores the data in order of page. For instance, when one memory block BLK is formed of 1028 pages, the data shown in FIG. 4 is stored in one memory block BLK in the semiconductor memory 12.

[Data Writing Operation]

Referring to FIGS. 6 to 8, a description will be given of the error detecting code generation operation and error correcting code generation operation performed by the error correction circuit 11 during data writing.

Firstly, as shown in FIG. 6, 8 write data items $D(1, 1)$ to $D(8, 1)$ to be written to the semiconductor memory 12 are supplied to the error correction circuit 11, where they are stored in the temporary storage circuit 20.

Subsequently, as shown in FIG. 7, the 8 write data items D(1, 1) to D(8, 1) are sent to the CRC generation units 21-1 to 21-8, respectively. The CRC generation units 21-1 to 21-8, in turn, generate 8 error detecting codes (CRC) for the respective 8 write data items D(1, 1) to D(8, 1). The 8 CRC codes are attached to the ends of the respective write data items D to thereby form a first data block UDa1. In the embodiment, the CRC generation units 21-1 to 21-8 perform their respective detecting code generation operations in parallel, thereby reducing the required processing time.

After that, the first data block UDa1 is sent to the ECC generation unit 22, as shown in FIG. 8. The ECC generation unit 22 generates, using the first data block UDa1, a first error correcting code (ECC) for correcting an error in the first data block UDa1. The ECC code is attached to the end of the first data block UDa1 to form data of page 1. The data of page 1 is sent to and stored in the semiconductor memory 12.

The same operation as the above is repeated to form data items of pages 2 to 1024, thereby forming the data shown in FIG. 4. The data items of pages 2 to 1024 are sent to and stored in the semiconductor memory 12.

After that, the RS generation unit 23 generates a second error correcting code (RS). At this time, the temporary storage circuit 20 already stores the write data items D(1, 1) to D(8, 1024) in rows and columns as shown in FIG. 5.

As shown in FIG. 9, a second data block UDb1 is formed from 1024 write data items D(1, 1) to D(1, 1024) arranged in the $1^{st}$ row, and is sent to the RS generation unit 23-1 via the temporary storage circuit 20. Similarly, second data blocks UDb2 to UDb8 are formed and sent to the RS generation units 23-2 to 23-8 via the temporary storage circuit 20.

Subsequently, as shown in FIG. 10, the RS generation unit 23-1 generates four RS codes RS(1, 1) to RS(1, 4), using the second data block UDb1. The RS generation units 23-2 to 23-8 perform the same RS generation operation as the RS generation unit 23-1. In the embodiment, the RS generation units 23-1 to 23-8 perform their respective correcting code generation operations in parallel. The parallel operations of the RS generation units 23-1 to 23-8 reduce the time required for processing.

When a reed-solomon code is used as an error correcting code, four redundancy codes are usually used to obtain two error position information items and two error correction information items, and hence two error corrections are possible. However, in the embodiment, to specify the positions of errors in write data D, CRC codes are also used. Accordingly, in the embodiment, four error corrections are possible using four redundancy codes. Namely, four errors contained in 1024 write data items D(1, 1) to D(1, 1024) can be corrected.

Thereafter, as in the case of the RS generation units 23-1 to 23-8, the CRC generation units 21-1 to 21-8 generates 8 CRC codes for 8 RS codes RS(1, 1) to RS(8, 1) arranged in one column. The thus-obtained 8 CRC codes are attached to the ends of the respective 8 RS codes to form a third data block UDc1. The ECC generation unit 22 uses the third data block UDc1 to generate an ECC code for correcting an error in the third data block UDc1. The ECC code is attached to the end of the third data block UDc1 to form data item of page 1025. The data item of page 1025 is sent to and stored in the semiconductor memory 12.

The same operation as the above is repeated to form data items of pages 1026 to 1028, thereby forming the data shown in FIG. 4. The data items of pages 1026 to 1028 are sent to and stored in the semiconductor memory 12.

[Configuration of Reading Circuit]

Figure 11:
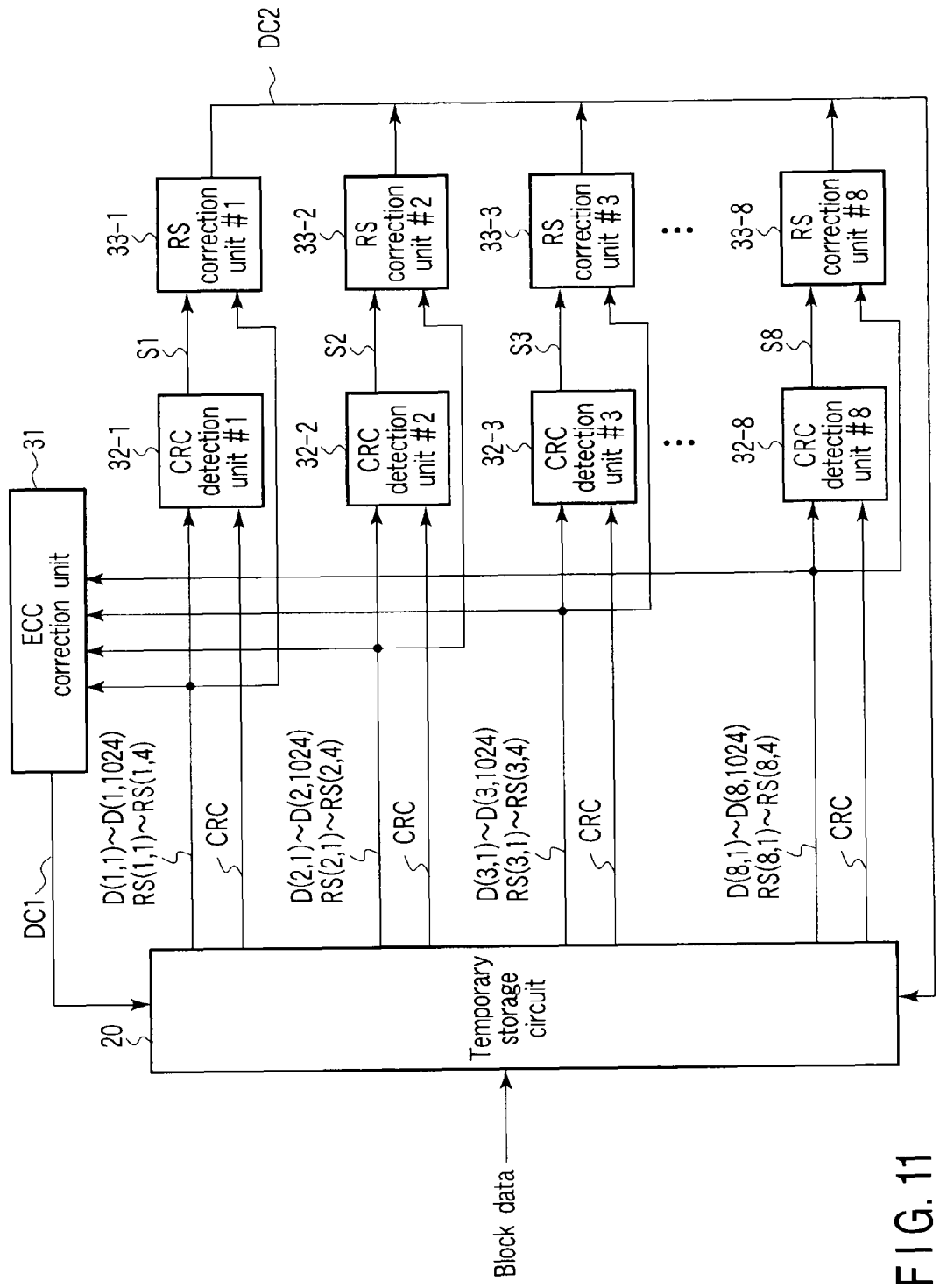
FIG. 11 is a block diagram illustrating the essential part of the error correction circuit 11 related to data reading.

FIG. 11 is a block diagram illustrating the essential part of the error correction circuit 11 related to data reading. When reading data, block data (the data shown in FIG. 4) stored in one memory block BLK of the semiconductor memory 12 is sent to and stored in the temporary storage circuit 20.

The error correction circuit 11 includes an ECC correction unit 31. The ECC correction unit 31 uses an error correcting code (ECC) generated in units of pages, to correct an error contained in the first data block UDap that includes 8 read data items D(1, p) to D(8, p) and 8 CRC codes corresponding thereto. A first corrected data DC1 corrected by the ECC correction unit 31 is sent to the temporary storage circuit 20. The temporary storage circuit 20 updates data stored therein and corresponding to the first corrected data DC1.

The error correction circuit 11 also includes a CRC detection unit 32. The CRC detection unit 32 includes 8 CRC detection units 32-1 to 32-8 corresponding to 8 read data items D(1, p) to D(8, p) arranged in one column, i.e., corresponding to the number of rows. The 8 CRC detection units 32-1 to 32-8 use 8 CRC codes generated for the respective read data items D(1, p) to D(8, p), to detect errors in read data items D(1, p) to D(8, p). The specific structure of the CRC detection unit 32 is known to anyone skilled in the art, and hence will not be described.

The error correction circuit 11 further includes an RS correction unit 33. The RS correction unit 33 includes 8 RS correction units 33-1 to 33-8 corresponding to 8 read data items D(1, p) to D(8, p) arranged in one column. The RS correction unit 33-1, for example, uses four RS codes RS(1, 1) to RS(1, 4) to correct errors in the second data block UDb1 formed of 1024 read data items D(1, 1) to D(1, 1024) arranged in the $1^{st}$ row. The specific structure of the RS correction unit 33 is known to anyone skilled in the art, and hence will not be described.

In the embodiment, reed-solomon (RS) codes are used as the second error correcting codes, and the four RS codes RS(1, 1) to RS(1, 4) are all used for error correction. Accordingly, the RS correction unit 33-1 can correct four read data items included in the 1024 read data items D(1, 1) to D(1, 1024). The same can be said of the RS correction units 33-2 to 33-8 corresponding to the second to eighth rows. A second corrected data DC2 corrected by any one of the RS correction units 33-1 to 33-8 is sent to the temporary storage circuit 20. The temporary storage circuit 20, in turn, updates the data stored therein and corresponding to the second corrected data DC2.

The read data items D(1, 1) to D(8, 1024) corrected by the ECC correction unit 31 and RS correction units 33-1 to 33-8 are output from the error correction circuit 11 to the outside.

[Data Reading Operation]

Referring then to FIGS. 12 to 15, a description will be given of the error detection operation and error correction operation of the error correction circuit 11 performed during data reading.

Before the error correction operation, block data (the data shown in FIG. 4) stored in one memory block BLK of the semiconductor memory 12 is sent to and stored in the temporary storage circuit 20.

Firstly, the ECC correction unit 31 performs a first error correction operation. Specifically, data of page 1 is sent to the ECC correction unit 31 via the temporary storage circuit 20. The ECC correction unit 31 uses the error correcting code (ECC) contained in the data of page 1 to correct an error contained in the first data block UDa1 of the page 1. Similarly, the ECC correction unit 31 corrects errors in the first data blocks UDa2 to UDa1028 contained in data of pages 2 to 1028. The first corrected data DC1 corrected by the ECC correction unit 31 are sent to the temporary storage circuit 20. The temporary storage circuit 20 updates data stored therein and corresponding to the first corrected data DC1.

Subsequently, the CRC detection unit 32 performs the first error detection operation. Specifically, the CRC detection units 32-1 to 32-8 use respective CRC codes to detect errors in the read data items D(1, 1) to D(8, 1). After the error detection, the CRC detection units 32-1 to 32-8 generate error information items S1 to S8 that indicate which read data D contains an error, respectively. The error information items S1 to S8 are sent to the RS correction units 33-1 to 33-8, respectively. The CRC detection units 32-1 to 32-8 perform the same error detection operation for data of pages 2 to 1028. The error detection operations of the CRC detection units 32-1 to 32-8 are performed in parallel to reduce the time required for the process.

Figure 12:
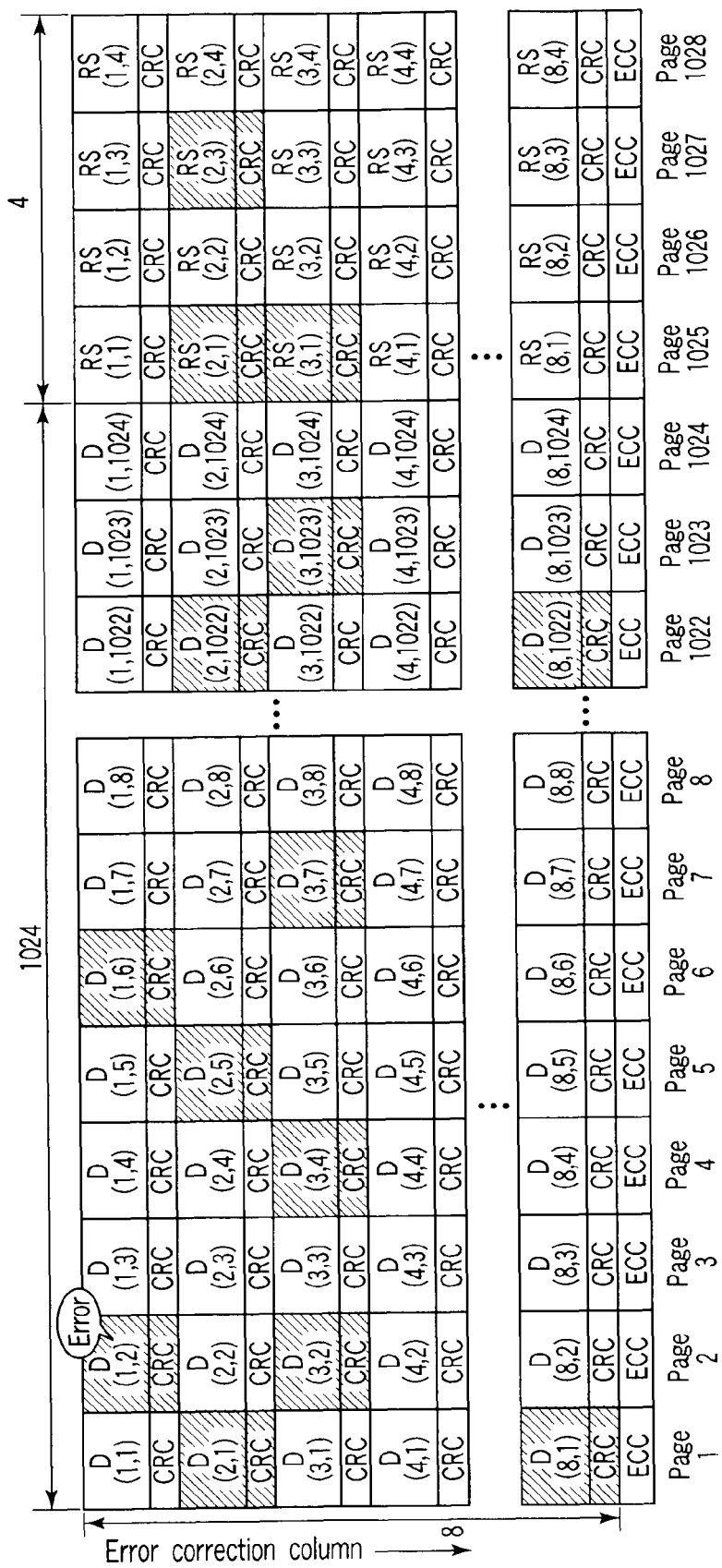
FIG. 12 is a view illustrating block data obtained by first error correction by an ECC correction unit 31.

FIG. 12 shows an example of block data obtained after the first error correction by the ECC correction unit 31. In FIG. 12, the hatched portions indicate data items having errors that are left even after the first error correction by the ECC correction unit 31 and detected by the CRC detection units 32-1 to 32-8.

If no errors exist in all read data items after the first error correction by the ECC correction unit 31, the error correction operation is finished. Namely, any error correction by the RS correction unit 33, described later, is not performed. For instance, supply of power from a power supply circuit (not shown) to the RS correction unit 33, or supply of a clock signal from a clock circuit (not shown) to the RS correction unit 33, is stopped to thereby stop its error correction operation. This reduces the data reading time in the case where only a small number of errors exist. Further, in this case, since the RS correction unit 33 does not perform an error correction operation, consumption of power is reduced.

After that, the RS correction unit 33 performs a first error correction operation. Specifically, a second data block UDb1, which is formed of 1024 read data items D(1, 1) to D(1, 1024) and four RS codes RS(1, 1) to RS(1, 4) corresponding to the second data block UDb1, are sent to the RS correction unit 33-1 via the temporary storage circuit 20. The RS correction unit 33-1 uses the four RS codes RS(1, 1) to RS(1, 4) to corrects errors in the read data items D(1, 1) to D(1, 1024). The RS correction units 33-2 to 33-8 corresponding to the second to eighth rows perform the same process as the above.

In the embodiment, the RS correction units 33-1 to 33-8 perform their correction operations in parallel. The parallel operations of the RS correction units 33-1 to 33-8 reduces the processing time. The second corrected data DC2 corrected by the RS correction units 33-1 to 33-8 is sent to the temporary storage circuit 20. The temporary storage circuit 20 updates data stored therein and corresponding to the second corrected data DC2.

Figure 13:
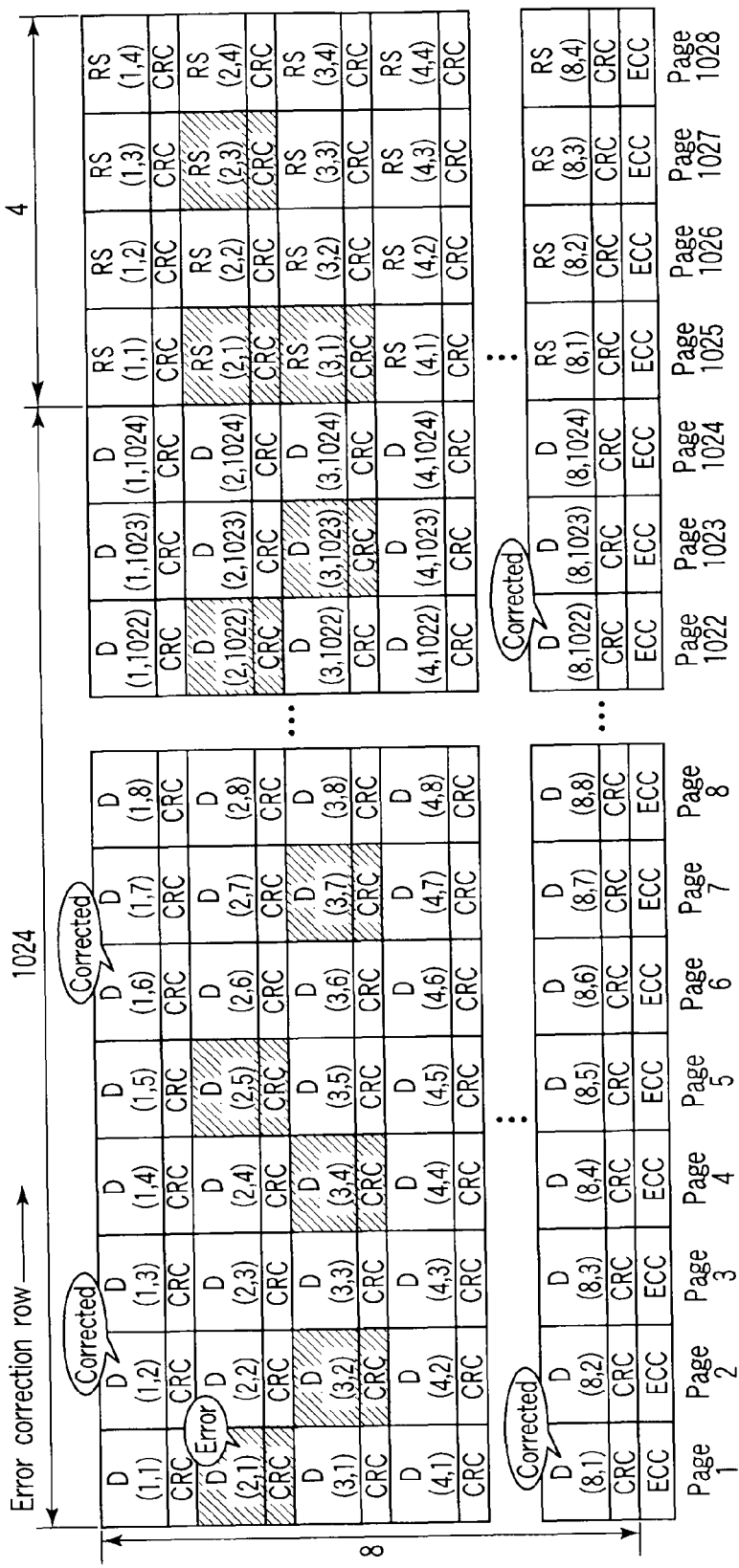
FIG. 13 is a view illustrating block data obtained by first error correction by an RS correction unit 33.

FIG. 13 shows an example of block data obtained after the first error correction by the RS correction unit 33. As shown in FIG. 13, errors in the read data items D(1, 2) and D(1, 6) are corrected by the RS correction unit 33-1. Further, errors in the read data items D(8, 2) and D(8, 1022) are corrected by the RS correction unit 33-8.

As mentioned above, the position of read data containing an error is specified by the CRC detection unit 32 before the error correction by the RS correction unit 33. Therefore, it is sufficient if the RS correction unit 33 performs error correction only on read data having an error thereof detected. This can reduce the time required for the RS correction unit 33 to perform correction, and can reduce the consumption of power.

Thereafter, the ECC correction unit 31 performs a second error correction on the data of pages 1 to 1028. The second error correction is the same as the first error correction by the ECC correction unit 31. FIG. 14 shows an example of block data obtained after the second error correction by the ECC correction unit 31. As shown in FIG. 14, errors in the read data items D(2, 1), D(3, 2) and D(2, 1022) are corrected by the ECC correction unit 31.

Subsequently, the CRC detection units 32-1 to 32-8 detect errors in all read data items D and error corrected codes (RS). This detection is the same as the above-mentioned first error detection by the CRC detection units 32-1 to 32-8. After that, the RS correction units 33-1 to 33-8 perform a second error correction on the second data blocks UDb1 to UDb8, respectively. The second error correction is the same as the above-mentioned first error correction by the RS correction units 33-1 to 33-8.

Figure 15:
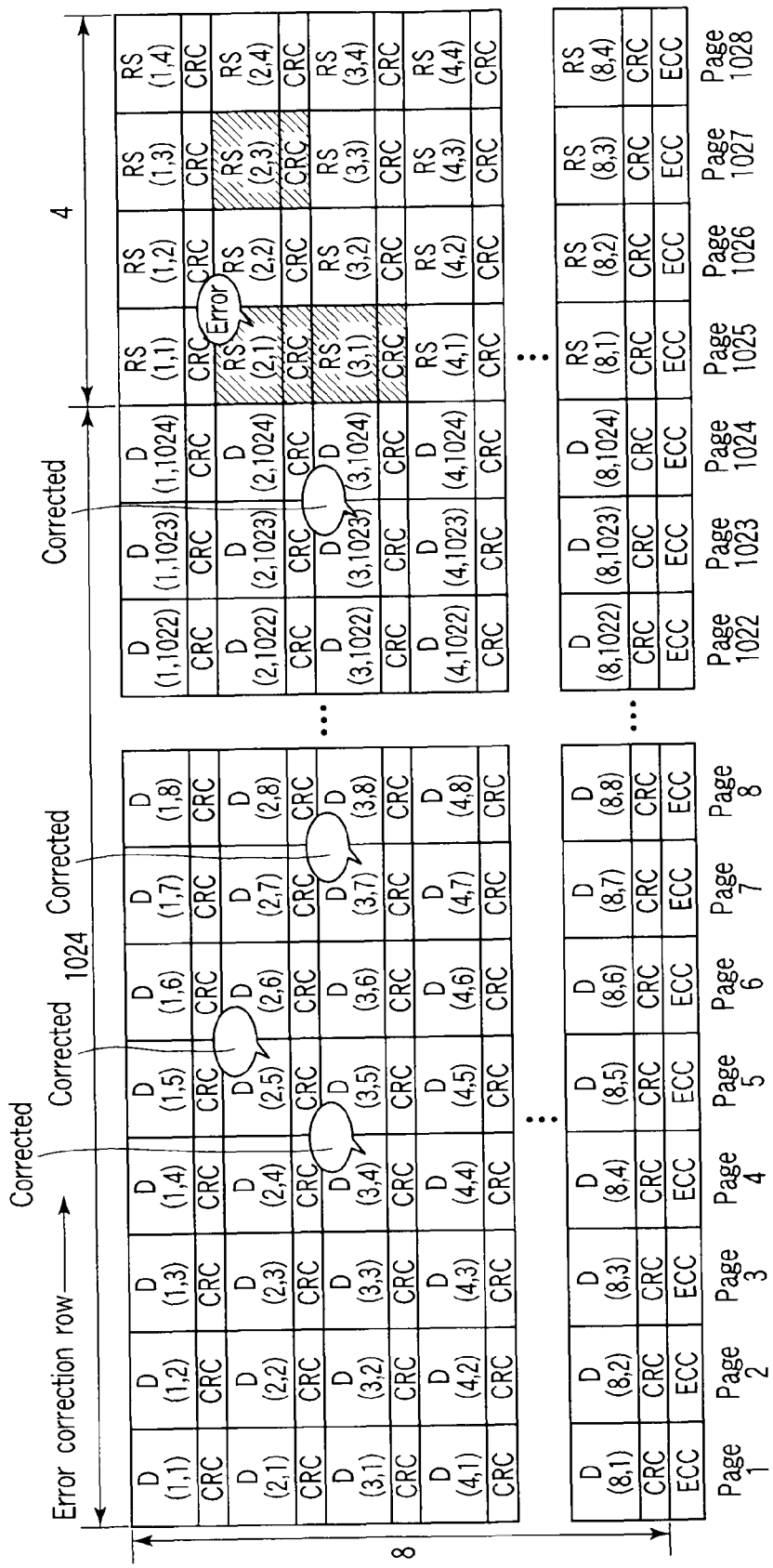
FIG. 15 is a view illustrating block data obtained by second error correction by the RS correction unit 33.

FIG. 15 shows an example of block data obtained after the second error correction by the RS correction unit 33. As shown in FIG. 15, an error in a read data item D(2, 5) is corrected by the RS correction unit 33-2. Further, errors in the read data items D(3, 4), D(3, 7) and D(3, 1023) are corrected by the RS correction unit 33-3. Thus, all errors in the read data items D(1, 1) to D(8, 1024) are corrected.

The read data items D(1, 1) to D(8, 1024) having their errors corrected are output from the temporary storage circuit 20 to the outside.

FIG. 16 shows the relationship between the time elapsing after data is written to the semiconductor memory 12, and required correction performance. As shown in FIG. 16, the longer the elapsed time, the greater the number of errors contained in data written to the semiconductor memory 12. In light of this, the error correction performance is varied in accordance with an increase in the number of errors. The error correction performance of the first error correction unit (ECC correction unit) 31 and second error correction unit (RS correction unit) 33 is determined so as not to achieve excessive or insufficient error correction performance. Specifically, the error correction performance of the first error correction unit 31 and second error correction unit 33 is determined so that when the elapsed time is short, only the first error correction unit 31 performs error correction, and after a preset time elapses (i.e., when the number of errors abruptly increases), both the first and second error correction units 31 and 33 perform error correction.

As described above in detail, in the embodiment, firstly, the first error correcting code (ECC) is used to correct errors, and the correction result is subjected to further error correction using the second error correcting code (RS). Therefore, even when the error correction performance levels of the first error correction unit 31 and second error correction unit 33 are set low, a desired correction performance can be secured with the circuit scale unchanged or reduced.

Further, if the result of the first error correction performed by the ECC correction unit 31 indicates that no errors are contained in all read data, the RS correction unit 33 does not perform correction, thereby reducing the time required for data reading when only a small number of errors are contained in data. As a result, both reduction of data reading time when only a small number of errors are contained, and realization of high correction performance when a large number of errors are contained can be achieved. Furthermore, since the operation of the RS correction unit 33 is conditionally stopped, the consumption of power can be reduced.

In addition, the first error correcting code (ECC) is used to correct an error in data arranged in a column, and the second error correcting code (RS) is used to correct an error in data arranged in a row. Accordingly, when a NAND flash memory is used as the semiconductor memory 12, error correction can be performed on data of all pages in each memory block. Also, since error correction can be performed a number of times on an area in which the probability of occurrence of errors is high, the embodiment is especially effective in a semiconductor memory in which the probability of occurrence of errors significantly differs between data storage positions.

Further, the position of read data that contains an error is detected by the CRC detection unit 32, and the RS correction unit 33 performs error correction only on the detected read data. Thus, the processing time of the RS correction unit 33 is minimized.

Since the position of data D containing an error is detected using an error detecting code (CRC), the RS correction unit 33 does not have to perform error detection. Therefore, all RS codes (four RS codes in the embodiment) can be used for error correction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor memory device comprising:
   a temporary storage circuit configured to receive a plurality of data items and store the data items in rows and columns;
   a detecting code generator configured to generate a plurality of first detecting codes used to detect errors in the plurality of data items, respectively;
   a first correcting code generator configured to generate a plurality of first correcting codes used to correct errors in a plurality of first data blocks corresponding to the columns, respectively, each of the first data blocks containing a number of data items that are arranged in a corresponding one of the columns;
   a second correcting code generator configured to generate a plurality of second correcting codes used to correct errors in a plurality of second data blocks corresponding to the rows, respectively, each of the second data blocks containing a number of data items that are arranged in a corresponding one of the rows;
   a semiconductor memory configured to nonvolatilely store the data items, the first detecting codes, the first correcting codes and the second correcting codes;
   a first corrector configured to correct errors in the plurality of first data blocks using the plurality of first correcting codes, respectively;
   a detector configured to detect errors in the first data blocks corrected by the first corrector, using the plurality of first detecting codes; and
   a second corrector configured to correct errors in data items detected by the detector, using the plurality of second correcting codes,
   wherein the first and second correctors alternately repeat respective correction operations based upon an elapsed time of writing.

2. The device according to claim 1, wherein each of the first data blocks includes a plurality of first detecting codes generated for the data items that are arranged in a corresponding one of the columns.

3. The device according to claim 1, wherein the detecting code generator further generates a plurality of second detecting codes used to detect errors in the plurality of second correcting codes, respectively.

4. The device according to claim 3, wherein the first correcting code generator further generates a third correcting code used to correct errors in a third data block comprising the plurality of second correcting codes.

5. The device according to claim 4, wherein the third data block includes the plurality of second detecting codes.

6. The device according to claim 1, wherein the temporary storage circuit updates the corrected first data blocks.

7. The device according to claim 1, wherein the detector generates error information indicating a data item whose error is detected, and the second corrector performs error correction based on the error information.

8. The device according to claim 1, wherein
   the semiconductor memory performs data reading and data writing, using a first data size as a minimum unit, and
   each of the first data blocks has the first data size.

9. The device according to claim 1, wherein the semiconductor memory is a NAND flash memory.

10. A method of controlling a semiconductor memory device, the method comprising:
    receiving a plurality of data items and storing the data items in rows and columns in a temporary storage circuit;
    generating a plurality of first detecting codes used to detect errors in the plurality of data items, respectively;
    generating a plurality of first correcting codes used to correct errors in a plurality of first data blocks corresponding to the columns, respectively, each of the first data blocks containing a number of data items that are arranged in a corresponding one of the columns;
    generating a plurality of second correcting codes used to correct errors in a plurality of second data blocks corresponding to the rows, respectively, each of the second data blocks containing a number of data items that are arranged in a corresponding one of the rows; and
    nonvolatilely storing, in a semiconductor memory, the data items, the first detecting codes, the first correcting codes and the second correcting codes;
    correcting errors in the plurality of first data blocks using the plurality of first correcting codes, respectively;
    detecting errors in the first data blocks, which are corrected using the first correcting codes, using the plurality of first detecting codes;
    correcting errors detected using the first detecting codes, using the plurality of second correcting codes; and
    alternately repeating the correcting using the first correcting codes and the correcting using the second correcting codes based upon an elapsed time of writing.

* * * * *